United States Patent [19]

Liggett et al.

[11] Patent Number: 4,898,744

[45] Date of Patent: Feb. 6, 1990

[54] METHOD FOR PREPARING AND PRESERVING FILLED PASTA PRODUCTS

[75] Inventors: Louis Liggett, Brooklyn; Michael McGuire, Elmhurst; Marcia Palmer, Nanuet; Ralph DeGiacomo, Palisades, all of N.Y.

[73] Assignee: General Foods Corporation, White Plains, N.Y.

[21] Appl. No.: 136,891

[22] Filed: Dec. 22, 1987

[51] Int. Cl.$^4$ .......................... D21D 2/08; A23L 3/00; A23L 1/162

[52] U.S. Cl. ..................................... 426/557; 426/94; 426/399; 426/418; 426/458; 426/521

[58] Field of Search ................. 426/94, 557, 418, 458, 426/521, 399

[56] References Cited

U.S. PATENT DOCUMENTS 3,219,456 11/1965 Matz et al. ............................ 426/94
4,493,850 1/1985 Fioravanti ............................ 426/458
4,597,976 7/1986 Doster et al. ....................... 426/557

OTHER PUBLICATIONS

Food Engineering, 1986, Dec., pp. 28-29.

*Primary Examiner*—Donald E. Czaja
*Assistant Examiner*—H. Pratt
*Attorney, Agent, or Firm*—Thomas R. Savoie; Daniel J. Donovan

[57] ABSTRACT

The present invention is concerned with preparing and preserving fresh stuffed pasta which maintains its freshness for up to 120 days comprising, preparing a uniform blend having a moisture of up to 33%, conditioning the uniform blend by compacting same into a sheet having thickness of at least 0.04 inches; preparing a filled mix for the dough; feeding the conditioned dough and filling mix to "filling" machine to produce a filled pasta; pasteurizing the filled pasta by subjecting it to steam; cooling the pasteurized filled pasta to a temperature between 30° F.; packaging the cooled pasteurized dough in a modified atmosphere environment; and storing the packaged dough for extended periods of time at temperatures ranging from 40° F. to 50° F.

10 Claims, 1 Drawing Sheet

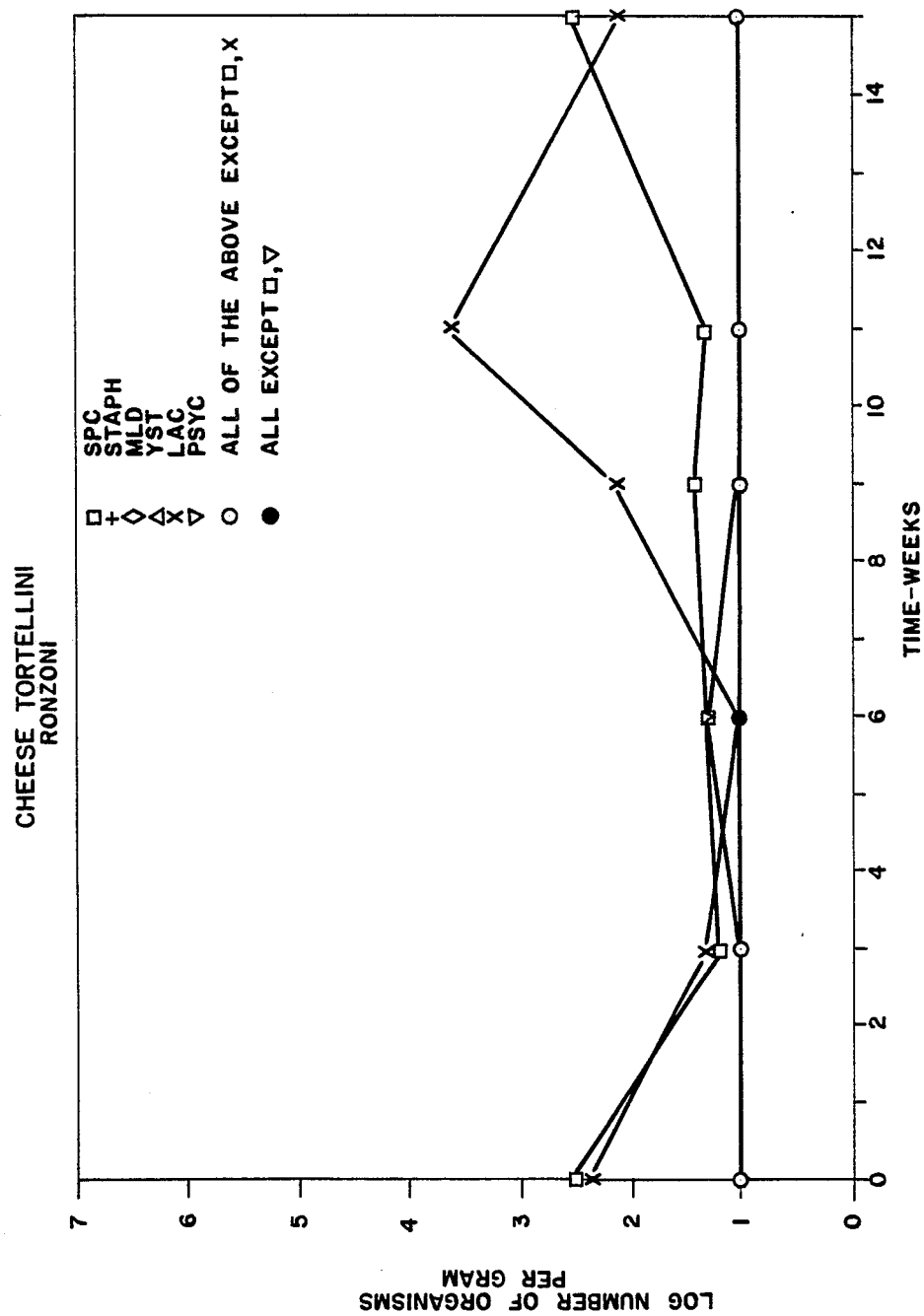

METHOD FOR PREPARING AND PRESERVING FILLED PASTA PRODUCTS

FIELD OF THE INVENTION

The present invention is concerned with the preservation of fresh filled pasta products. More particular, the present invention is concerned with extending the shelf life of fresh filled refrigerated pastas for up to 120 days while maintaining its quality attributes.

BACKGROUND OF THE INVENTION

Pasta products are generally prepared by first combining wheat flour with water and mixing to form a dough. The dough mixture is then extruded through a die and the extrudate dried under controlled temperature and humidity. Drying is typically accomplished at temperatures of up to 75° C. and relative humidity of up to 85%. To prevent cracking and breaking the rate of drying is generally relatively slow. Since the protein and starch of the dried product remain in their natural state, then prior to consumption the product must be cooked wherein the protein is denatured and the starch gelatinized. One of the major draw back of dried pasta is uneven cooking which generally result in the central core of the pasta containing a substantial amount of undenatured protein and ungelatinized starch.

Attempts to overcome this problem is disclosed in U.S. Pat. No. 4,539,214 by Winter et al, wherein the dough is extruded at a moisture of between 28% and 40% into lengths to form a cut product having wall thickness of between 0.3 to 0.7 mm and wherein the product is simultaneously cooked and dried by exposure to dry super-heated steam in the absence of water, resulting in a rapidly rehydratable product. The product resulting therefrom, however, still does not exhibit the texture and flavor of freshly made pasta.

Other attempts to improve the quality of pasta is disclosed in U.S. Pat. No. 4,675,199 by Hsu wherein flour is mixed with from 15 to 33% water based on the weight of the flour to form a dough. The dough is then extruded through a pasta die provided with at least three superimposed nozzles for forming dough sheets, and the extruded, superimposed dough sheets are compressed into one dough sheet which is then cut to form the desired pasta shape.

In the case of stuffed pasta such as ravioli, tortellini, cannelloni and the like, long standing problems such as the inability to preserve the stuffed pasta in a good state for a certain period of time has been unresolved. Several processes have been developed to insure that neither the outer shell portion nor the inner stuffing which generally constitute meat, greens, cheese and other suitable stuffing, undergo deterioration between production and consumption. One process utilized to obtain longer storage time consists of utilizing special driers. This process, however, proved unsatisfactory. Other attempts such as freezing and overfreezing the stuffed pastas into special cooling equipment; canning of the product and subsequently processing in an autoclave; and using germicide lamps or irradiations, for example gamma rays, emitted by radioactive isotopes, all proved to be impractical and uneconomical.

Generally, the products which have undergone normal drying can only be stored for short periods of time which varies based on the composition of the stuffing and the conditions underwhich the product was prepared. However, even if proper drying of the outer casing is achieved, longer term storage would be limited mainly because of the composition of the stuffing. Attempts to overcome this problem is disclosed in U.S. Pat. No. 3,281,248 by Fioravanti et al, wherein stuffed pasta shells are immersed into a liquid selected from water, broth and a mixture of water and oil, said liquid having a temperature of from 65° to 120° C. for a period of time ranging from 1 to 240 seconds, followed by removing the stuffed shell from the liquid and heating same to temperatures ranging from 70° to 225° C. for a period of time ranging from 30 seconds to 30 minutes. It is believed, however, that the resulting product hereof produces a dough casing with a hard marble-like consistency. U.S. Pat. No. 4,493,850 on the other hand subjects the filled shell to a high moisture and temperature environment followed by drying same until the dough casing reaches a pre-determined moisture content. The dried product is then packaged under vacuum and again subjected to a high temperature environment to produce a filled dough package product with extended stability without developing signs of deterioration, and mold etc. None of these references, however, teaches maintaining freshness in texture, appearance and taste of a pasta product over extended period of time.

It is, therefore, an object of the present invention to provide a fresh stuffed pasta product that maintains its freshness for extended periods of time.

Another object of the present invention is to provide a process for preserving fresh stuffed pasta which maintains its freshness for extended periods of time.

SUMMARY OF THE INVENTION

These and other objects will become more apparent from the remainder of the specification and is more fully achieved by a method for preparing and preserving a filled fresh pasta shell which maintains its freshness for up to 120 days without lowering the moisture to levels which prohibit growth of organisms which cause deterioration comprising the steps of: preparing a uniform blend comprising flour, whole eggs and water having a moisture content of up to 30%; conditioning the uniform blend by compacting same to form a dough having a thickness of at least 0.05 inches; forming and filling the sheeted dough with a filling composition selected depending on the end product desired; contacting the filled dough with steam for a time and at a temperature sufficient to pasteurize said filled dough; cooling the pasteurized filled dough to a temperature between about 30° F. and about 50° F.; packaging the cooled pasteurized filled dough in a modified atmosphere environment; and storing the packaged product for extended periods of time at temperatures ranging from about 40° F. to about 50° F.

BRIEF DESCRIPTION OF THE DRAWING

Reference may now be had to the following detailed description of a preferred embodiment of the present invention showing the advantageous and novel attributes thereof, taken in conjunction with the accompanying drawing; in which:

FIG. 1 illustrates the storage stability of tortellini over a 15 week period.

DETAILED DESCRIPTION

The ability to produce the product of the present invention is dependent upon the cumulative effect of the steps necessary to produce a fresh filled pasta product.

Since the presence of microorganisms play a significant role in product degradation over time, then the control of the microbial population in the dough shell and filling becomes a critical factor in accomplishing the objects of the present invention. Each step contributes towards controlling the microbial population, so that the finished package product can maintain its freshness for up to 120 days.

To maintain the freshness of the stuffed pasta product of the present invention without lowering the moisture to levels which prohibit growth of organism which cause deterioration of the product, requires monitoring and taking precautionary measures at each step of the process beginning with the raw materials. These raw materials are purchased pursuant to established specifications and tested prior to use to assure compliance therewith. Care is taken to prevent further contamination and to minimize microbial growth, such as storing of temperatures prior to use which inhibit microbial growth.

The process utilized in the present invention is suitable for the production of a wide variety of stuffed pastas. The first step in the process is the preparation of a uniform blend comprising flour, whole eggs and water. The type of flour used maybe, for example, Durum wheat, Semolina wheat, whole wheat flour and other flours suitable for the preparation Of pasta dough such as corn flour, rice flour, potato flour to name a few. The amount of water added to the flour generally ranges from about 10% to about 15% by weight of the uniform blend and preferably from about 12% to about 13%. The amount of flour in the mixture generally ranges from about 60% to about 80% and preferably about 70% by weight. The amount of whole eggs generally ranges from about 10% to about 14% by weight of the mixture and preferably about 12%.

Optionally, other materials may be utilized in the preparation of the pasta dough. For instance, protein materials such as egg white, egg yolk, wheat gluten, soy protein isolate and the like may be added to the flour in amounts ranging from about 10% to about 15% by weight of the flour. Materials such as sodium alginate, potassium alginate and other suitable gum may also be added and is generally present in amounts ranging from about 0.1% to about 1% by weight. Also, surfactants such as glycerol monostearate may be present in amounts ranging from about 0.1% to about 0.5% by weight.

If desired, vegetable materials such as spinach, carrot or tomato or flavors and concentrate of vegetable materials maybe added to the flour to produce flavored pasta dough such as spinach. These materials are generally present in amounts ranging from about 0.5% to about 5.0% by weight of the flour.

The flour, whole eggs and water, and any optional ingredients are mixed to form a uniform blend by conventional means and monitored to ensure complete mixing. Suitable mixers include paddle mixers, ribbon mixers or continuous macaroni mixers. The moisture content of the mixed blend should generally range from about 25% to about 33% and preferably from about 25% to about 30%.

The thoroughly mixed uniform blend is then made into a dough and conditioned by passing same through a dough conditioner machine consisting of a series of rollers which sheets the dough in stages to the desired thickness. The first passage through the machine produces a sheeted dough having a thickness of no greater than 0.25 of an inch. The thickness was further reduced by subsequent passage through the dough conditioner machine until the dough achieved a thickness of no less than 0.04 inch. Care should be taken, however, to insure that the moisture of the uniform blend does not fall below 25%. Failure to control the moisture will have a negative effect on the functionality of the dough produced, particularly during slicing. For instance, if the moisture falls below 25% cracking generally occurs during subsequent processing, and if the moisture goes above 33% the dough becomes too soft and elastic, resulting in case hardening.

Conditioning of the dough can be accomplished by several other means. It is preferred, however, to use a "Giacomo Torresani" which utilizes rollers. These rollers are designed in a manner to accommodate adjustments of the distance between them so that the thickness or degree compression of the dough can be controlled. Generally the distance can vary from 0.250 inches to 0.095 inches. The final thickness of the dough is dependent on the end product desired. As the product passes through the conditioning machine, care should also be taken to prevent microbial contamination.

Simultaneous with the preparation of the dough, a filling mix is prepared. The filling mix will vary depending on the desired end product. For instance, in the case of tortellini the filling mix comprises Romano cheese, Parmesan cheese, Fontina cheese, Ricotta cheese, and other cheeses, egg white, bread crumbs and spices. The filling components are mixed thoroughly at room temperature, cooled down to temperature ranging from about 35° F. to about 60° F. and kept at that temperature until use. The cheeses utilized in the filling mix must be kept refrigerated prior to use. Lowering the temperature of the filling mix serves the purpose of retarding microbial growth and aids in the extrusion and filling of the dough component. It was discovered that the colder the product, the easier it extrudes.

The conditioned dough and filling mix is transferred to the filling machine where the filling mix is encased by the dough. In the present invention a conventional forming machine is utilized wherein a small filled casing or shell of dough having thickness of about 0.04 to 0.05 inches is produced. The temperature of the filling mix should preferably be maintained about 40° F. Temperatures above 40° F. will enhance microbial growth. Also, to enhance preservation, the pH of filling mix may be adjusted to a pH ranging from 4.50 to 6.0 and preferably about 5.0–5.5. Typically, this is accomplished by the use of food grade acids.

The filled product is then conveyed to a steamer and heated for a time and at a temperature sufficient to pasteurize the product, hence, providing a further kill step to control microbial growth. The steaming step further, partially cooks the product to achieve the proper final texture by partially denaturing the protein and partially gelatinizing the starch. The temperature within the steamer is generally sufficient to achieve a product center temperature of about 200° F. said temperature generally ranging from 200° F. to 212° F. Suitable temperature, however, generally ranges from 205° F. to 210° F. The length of time the product remains in the steamer is generally determined by the time it takes to achieve the internal product temperature of 200° F. The length of time, however, generally ranges from about 3 minutes to about 5 minutes and preferably about 4 minutes. It is further believed that the steaming process destroys the enzymes naturally present within the filled dough thus preventing such enzyme from affecting the color and flavor of the final product.

The steamed product is then cooled to temperatures ranging from about 30° F. to about 50° F. prior to packaging. Care should be taken to ensure cooling under sanitary conditions. Condensation should be eliminated or minimized in an attempt to inhibit microbiological growth. The length of time required to cool the product and the moisture of the product are critical in controlling microbial growth. Faster cooling times are preferred. Typical cooling time should not exceed 4 hours. Also, segregated storage area for cooling minimizes microbiological contamination.

The cooled product is then packaged in a sterile tray under modified atmosphere conditions for long term storage. The cooled product is first placed in a preformed tray and simultaneously with drawing a vacuum on the tray, a predetermined proportioned amount of $CO_2$ and $N_2$ are injected into the package and a layer of film is applied to the top of the tray and sealed thereto. The ratio of $CO_2:N_2$ in the modified atmosphere generally ranges from 25:75 to 80:20. The ratio of $CO_2:N_2$ will generally vary with the desired end product. It is important in the present invention that the oxygen content of the modified atmosphere be less than 1.0%.

High levels of $CO_2$ are generally preferred because they increase the storage stability life of the product. These high levels, however, generally cause product blistering while too low levels of $CO_2$ cause shelf life failure. It was found that reducing the packaging temperatures of the product to temperatures ranging from 25° F. to 35° F. eliminate blistering in all the products. It is believed that low temperatures in combination with low surface moisture results in less $CO_2$ being absorbed on the surface of the product.

The packaged product is stored at temperatures ranging from 40° F. to 50° F. for up to 120 days. The actual length of time varies with the particular product and generally ranges from 50 days to 120 days at the required temperature.

Controlling microbial activity at each stage of the process is critical. The cumulative effect of controlling the activities at each step is necessary to produce product stability for extended periods of time.

The following chart illustrates the storage stability of tortellini over a 15 week period.

The following examples further illustrate the present invention.

EXAMPLE 1

Wheat flour, water and whole eggs were mixed in a Giacomo Torresani Paddle Mixer ® to form a uniform blend having a moisture content of 30.0%. The dough was further mixed for about 7 minutes. The uniform blend was then conveyed to a dough conditioner machine, (Giacomo Torresani) consisting of a series of rollers wherein a smooth sheet was prepared. The dough was fed through a first series of rollers to produce a sheet having thickness of 0.25 inch; then through a second series of rollers to produce a thickness of 0.05 inches. The moisture of the dough during- conditioning was 30.0%.

Simultaneous with the preparation of the dough a filling mix was prepared. The filling cheese consisted of Romano cheese; Parmesan cheese; Fontina Cheese; Ricotta cheese; egg white; bread crumbs and spice mix. The mixture is blended to form a uniform blend and stored at 40° F. prior to use. The conditioned sheeted dough and filling mix is then fed to a conventional "tortellini" machine to produce a batch of filled "tortellini" casing having an average thickness of about 0.045 inches.

The formed "tortellini" was then conveyed to a steamer. The steamer was preset to produce a temperature at 210° F., and the retention time within the steamer was 4 minutes sufficient to pasteurize and further control microbial growth. The steamed tortellini was then rapidly cooled to 30° F. within 45 minutes. The retention time within the cooler is critical because it affects the microbial stability of the product and the product moisture level.

The cooled product was filled into trays and transferred to the packaging line. Care was taken to minimize product breakage and microbiological contamination. The product was then sealed in a modified atmosphere environment consisting of $CO_2$ and $N_2$ at a ratio of 80:20. The package was then stored at 40° F. for up to 120 days.

EXAMPLE 2

A spinach pasta was prepared according to Example 1 except that 1.5% of spinach powder was added to the wheat flour, water and whole egg mixture. The ratio of $CO_2$ to $N_2$ in the modified atmosphere was 80:20. The package was stored at 40° F. for up to 120 days.

What is claimed is:

1. A method for preparing and preserving filled dough product in the form of a filled fresh pasta shell which maintains the freshness for up to 120 days without lowering the moisture to levels which prohibit growth of organisms which cause deterioration comprising the steps of:
    (a) preparing a uniform blend comprising flour, water and whole eggs having a moisture content of up to 33%;
    (b) conditioning the uniform blend by compacting same to form a sheet of dough having a thickness of at least 0.04 inches;
    (c) forming and filling the sheeted dough with a filling composition having a pH ranging from 4.5 to 6.0 selected depending on the end product desired;
    (d) contacting the filled dough with steam in a single steam treatment for a time and at a temperature sufficient to pasteurize said filled dough;
    (e) cooling the pasteurized filled dough shell to temperatures between about 30° F. and 50° F.;
    (f) packaging the cooled pasteurized filled dough in a modified atmosphere environment; and
    (g) storing the packaged product for extended periods of time at temperatures ranging from about 40° F. to about 50° F.

2. A process according to claim 1 wherein the moisture content of the dough ranges from about 25% to about 33%.

3. A process according to claim 1 wherein the thickness of the compacted dough ranges from 0.04 inches to 0.05 inches.

4. A process according to claim 1 wherein the dough is contacted with steam having temperatures ranging from about 200° F. to about 212° F.

5. A process according to claim 4 wherein the dough is contacted with steam having temperatures ranging from about 205° F. to about 210° F.

6. A process according to claim 1 wherein the dough is contacted with steam for a time ranging from about 3 minutes to about 5 minutes.

7. A process according to claim 1 wherein the modified atmosphere comprises $CO_2:N_2$ at a ratio ranging from about 25:75 to about 80:20.

8. A process according to claim 1 wherein the modified atmosphere consists of less than 1.0% oxygen.

9. A process according to claim 1 wherein the fresh filled pasta comprises ravioli, tortellini, capelletti, canelloni and the like.

10. A product produced according to the process of claim 1.

* * * * *